(12) United States Patent
Teufel et al.

(10) Patent No.: US 6,505,888 B1
(45) Date of Patent: Jan. 14, 2003

(54) HEIGHT ADJUSTMENT DEVICE FOR A VEHICLE SEAT

(75) Inventors: Ingo Teufel, Rockenhausen (DE); Joachim Muhlberger, Grunstadt (DE)

(73) Assignee: Keiper GmbH & Co, Kaiserslautern (DE)

(*) Notice: Subject to any disclaimer, the term of this patent is extended or adjusted under 35 U.S.C. 154(b) by 0 days.

(21) Appl. No.: 09/807,479

(22) PCT Filed: Jul. 26, 2000

(86) PCT No.: PCT/EP00/07127

§ 371 (c)(1),
(2), (4) Date: Apr. 13, 2001

(87) PCT Pub. No.: WO01/12460

PCT Pub. Date: Feb. 22, 2001

(30) Foreign Application Priority Data

Aug. 14, 1999 (DE) .......................... 199 38 717

(51) Int. Cl.⁷ .............................................. B60N 2/427
(52) U.S. Cl. ............................ 297/344.15; 297/344.12; 297/216.1
(58) Field of Search ....................... 297/344.12, 344.15, 297/216.1

(56) References Cited

U.S. PATENT DOCUMENTS

| 4,229,041 A | * | 10/1980 | Werner | 297/468 |
|---|---|---|---|---|
| 4,248,480 A | * | 2/1981 | Kouck et al. | 297/473 |
| 4,487,454 A | * | 12/1984 | Biller | 297/468 |
| 4,705,296 A | * | 11/1987 | Andersson | 280/806 |
| 4,790,597 A | * | 12/1988 | Bauer et al. | 297/468 |
| 4,913,497 A | * | 4/1990 | Knabel et al. | 297/480 |
| 4,944,531 A | | 7/1990 | Knabel et al. | |
| 5,676,424 A | * | 10/1997 | Winkelhake | 297/337 |
| 6,116,689 A | | 9/2000 | Bauer et al. | |

FOREIGN PATENT DOCUMENTS

| DE | 197 40 043 A | 3/1999 |
|---|---|---|
| EP | 0 300 470 A | 1/1989 |

* cited by examiner

Primary Examiner—Peter M. Cuomo
Assistant Examiner—Joseph Edell
(74) Attorney, Agent, or Firm—Alston & Bird LLP

(57) ABSTRACT

In a height adjuster (11) for a vehicle seat, in particular an automobile seat, with a rocking arm (9) connected to a seat frame (10), the rocking arm mounting a toothed segment (15), and with a connector with a mounting point (28) for a belt lock arranged on the seat frame (10) for rotation about an axis of rotation (30) relative to the seat frame (10), wherein the connector (16,22) comprises an engagement mechanism which cooperates with the toothed segment (15) in the case of a crash, and the axis of rotation (30) is arranged between the engagement mechanism and the mounting point (28) for the belt lock.

22 Claims, 4 Drawing Sheets

HEIGHT ADJUSTMENT DEVICE FOR A VEHICLE SEAT

The invention relates to a height adjuster for a vehicle seat, in particular for an automobile seat, with the characteristic features of the preamble of claim 1, and a vehicle seat with the characteristic features of claim 10.

In the case of a height-adjustable vehicle seat, the lock for the safety belt is mounted to the seat frame, so as to move along, when the height is adjusted. When a high tensile force acts upon the belt lock in the event of a crash, the mounting point and the associated part of the seat frame, as well as the drive will be extremely stressed. DE 197 40 043 A1 discloses a height adjuster of this kind, wherein the belt lock is arranged on an L-shaped connector. The one-piece connector is jointed at the end of its one arm to the seat frame, and it comprises between the jointing and the mounting point for the belt lock, an individual cam as a range of engagement. In the event of a crash, the connector pivots because of its L-shape, and pushes the cam located in the vicinity of the pivot pin into a toothed segment, which is formed on a rear rocking arm.

It is the object of the invention to improve a height adjuster of the initially described kind. In accordance with the invention, this object is accomplished by a height adjuster having the characteristic features of claim 1, and by a vehicle seat having the characteristic features of claim 10. Advantageous configurations are subject matter of the dependent claims.

As a result of arranging the axis of rotation between the range of engagement and the mounting point for the seat lock, in particular in the longitudinal direction of the vehicle seat, it is possible to arrange the range of engagement and the mounting point in an improved and simple manner on different sides of the seat frame. At the same time, it is possible to make the distances of the range of engagement and the mounting point from the axis of rotation identical or different depending on the desired lever action. In this connection, it will be of advantage, when the distance of the range of engagement from the axis of rotation is greater than the distance of the axis of rotation from the mounting point for the belt lock. The range of engagement will then cover a greater distance, i.e., need not be arranged so close to the toothed segment in the normal use, so that no inadvertent engagement occurs already at a slight pull.

To keep the distance small, which is to be covered by the mounting point for the belt lock, it will further be of advantage, when the mounting point in the longitudinal direction of the vehicle seat, namely in the normal travel direction of the automobile, is arranged before the axis of rotation, preferably at the same height. Already after a slight rotation, the mounting point and axis of rotation will lie along one line, so that tensile forces can be transmitted in the longitudinal direction of the connector.

Preferably, the range of engagement comprises at least two teeth, so that a reliable engagement occurs. The teeth of the range of engagement and of the toothed segment may be tapered, and in particular the teeth of the range of engagement may be slightly bent or be made in the shape of sawteeth, so as to avoid a "tooth-on-tooth" position.

A bipartite construction of the connector has the advantage that it simplifies assembly. In this instance, the range of engagement will be associated to one of the two members, whereas the mounting point for the belt lock is associated to the other member. To keep the number of components as low as possible for cost reasons, the two members of the connector comprise preferably one shoulder each for the bearing mount in the seat frame. In this instance, the shoulders are made integral with the respective member of the connector, and perpendicular to the axis of rotation. The common axis of rotation of the two members extends through the centers of the shoulders. Preferably, the two members are joined for corotation. To this extent, they mesh with each other, preferably via a tooth engagement or another formfitting engagement, so that they rotate together without slip about the axis of rotation.

In the following, the invention is described in greater detail with reference to an embodiment illustrated in the drawing, in which.

Figure 2:
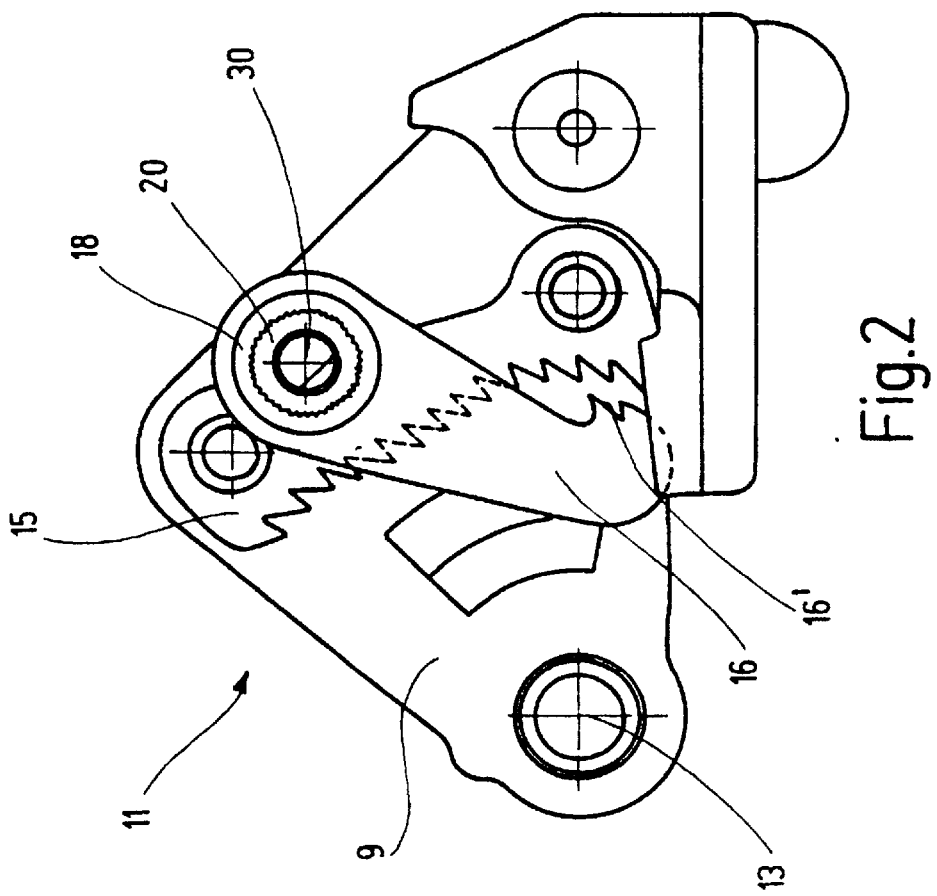
FIG. 2 is a side view of a part of the embodiment shown without seat frame and lever in the lowest position.
Figure 1:
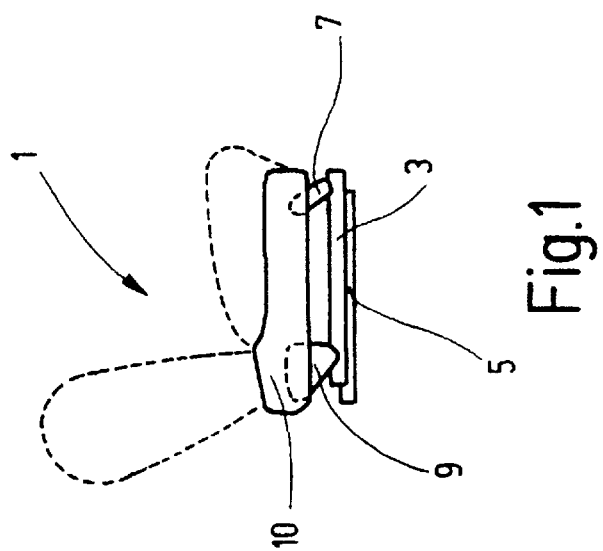
FIG. 1 is a side view of a vehicle seat according to the invention.
Figure 3:
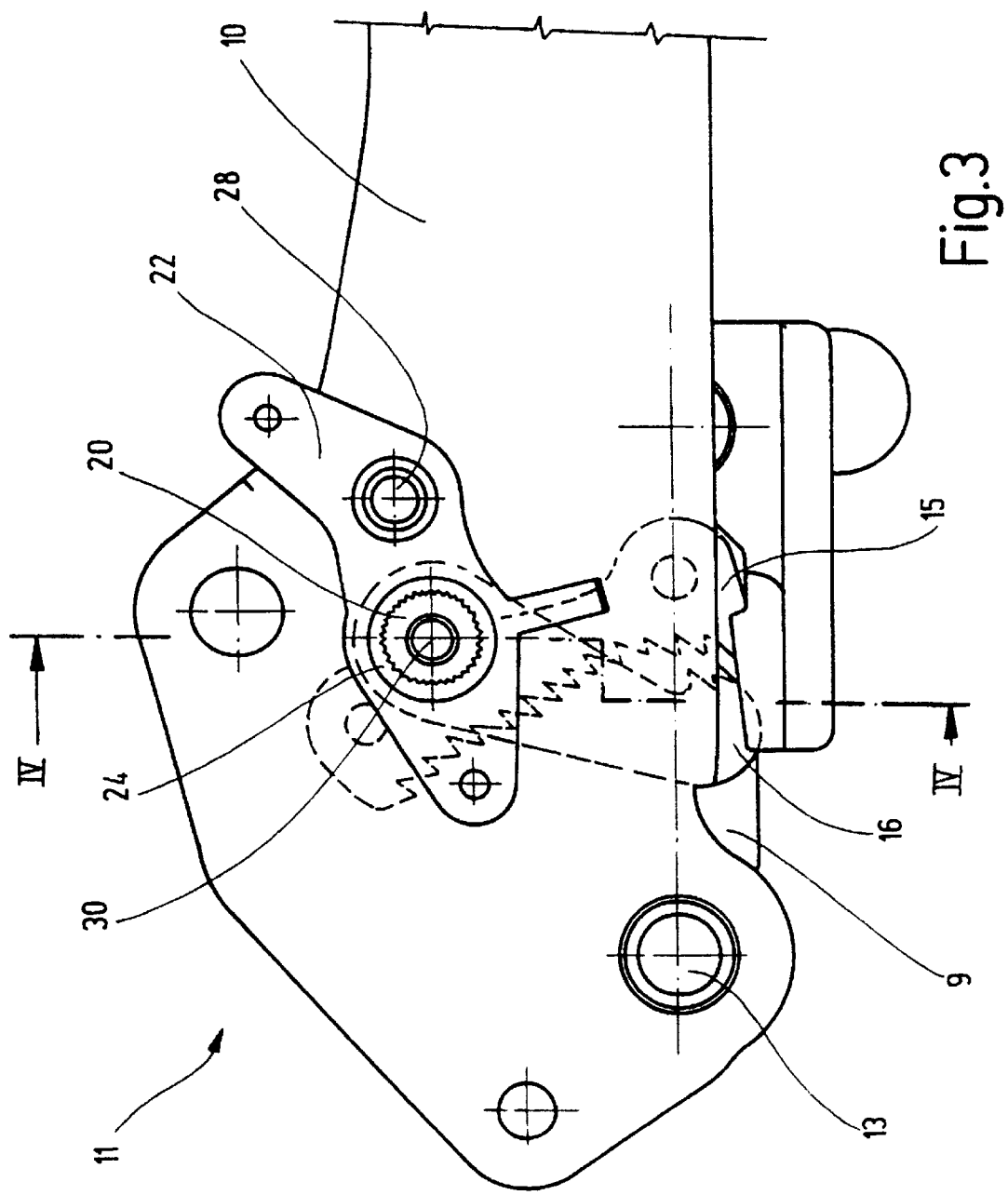
FIG. 3 is a side view according to FIG. 2 with seat frame and lever.
Figure 4:
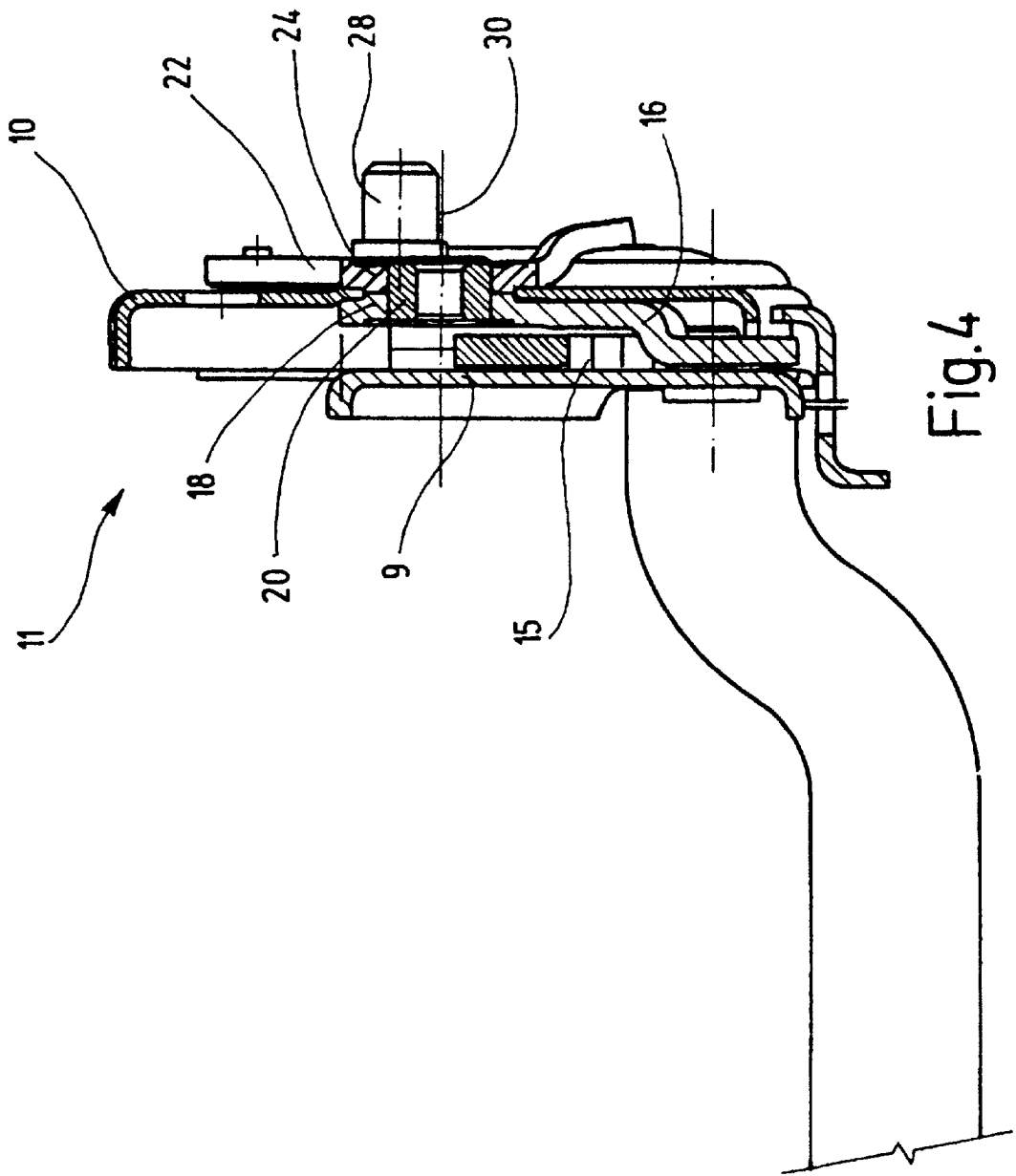
FIG. 4 is a sectional view along line IV—IV of FIG. 3.

A vehicle seat 1 of an automobile comprises on its two sides respectively an upper rail 3 integral with the seat structure and a lower rail 5 integral with the vehicle structure. Jointed with their one end to each upper rail 3 are respectively a front rocking arm 7 and a rear rocking arm 9. With their other end, they are jointed to a seat frame 10. Together with a drive not shown in greater detail, the rocking arms 7 and 9 form a height adjuster 11. The seat frame 10 mounts a seat cushion shown in the drawing only in phantom lines. A seat back likewise shown only in phantom lines connects to the seat frame 10 by means of mounting components.

In the following, the description refers for the sake of simplicity to only the right side of a vehicle seat 1 serving as the driver seat. The rear rocking arm 9 is arranged on the inner side of seat frame 10. A horizontal axle 13, which extends crosswise to the longitudinal direction of vehicle seat 1 from the one side of the vehicle seat 1 to the other side thereof, forms the jointing point of rear rocking arm 9 to seat frame 10. On its side directed outward in the transverse direction of vehicle seat 1, the rocking arm 9 mounts a toothed segment 15, whose center of curvature coincides with axle 13. The rocking arm 9 and toothed segment 15 may also be made in one piece.

Arranged on the inner side of seat frame 10 is a pawl 16. At its upper end on the outward directed side, the pawl 16 mounts an annular shoulder 18. On the annular shoulder 18, a tooth profile 20 is provided in concentric relationship therewith and with a somewhat smaller diameter and an external toothing. This tooth profile is firmly pressed into shoulder 18. The shoulder 18 is made in one piece with pawl 16. The pawl 16 is mounted with the shoulder 18 for rotation in an opening of seat frame 10.

Figure 5:
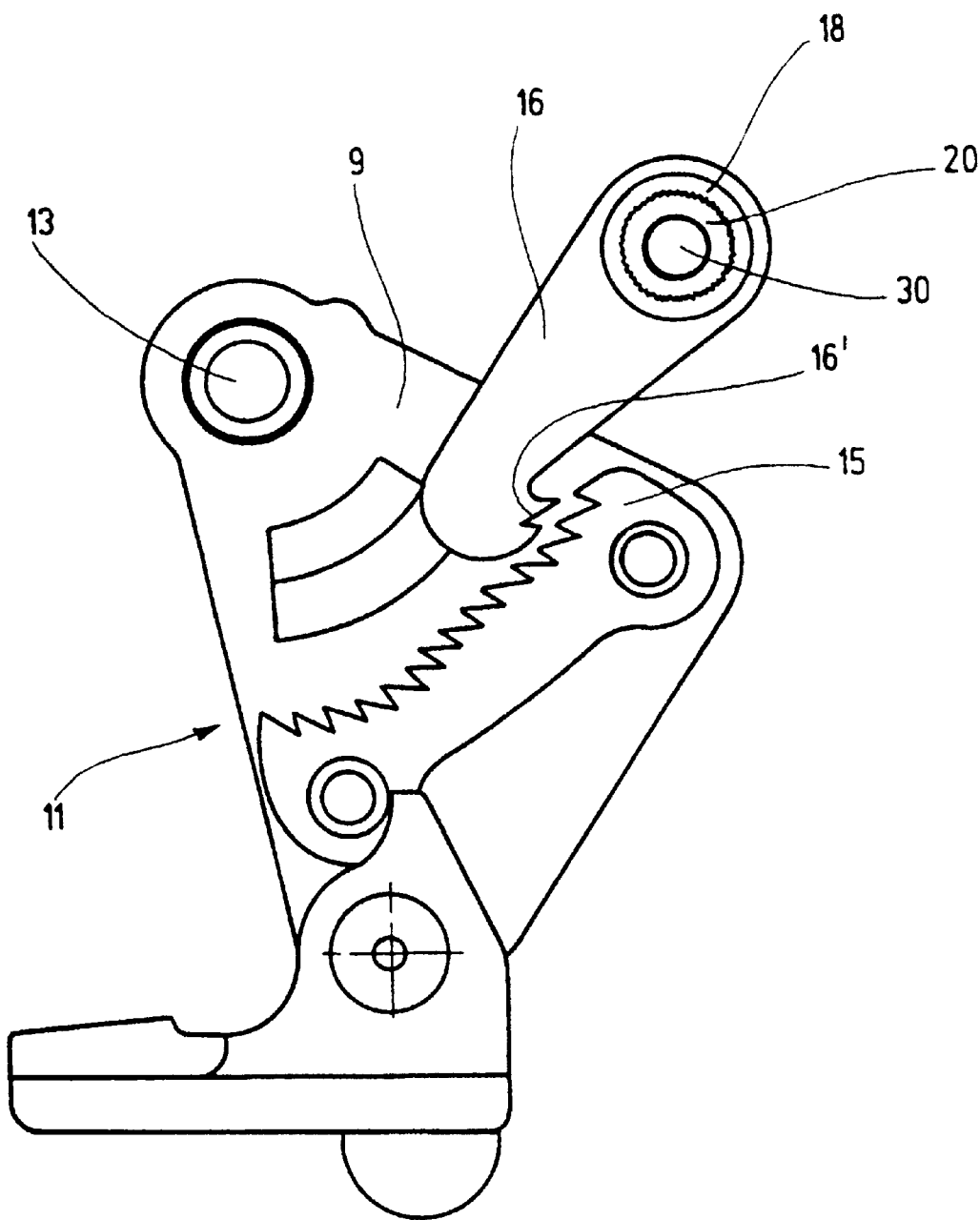
FIG. 5 is a side view according to FIG. 2 in the highest position.

At its lower end, which is offset from the other parts of the pawl 16 in the transverse direction of vehicle seat 1 by the thickness of toothed segment 15 and closer to the rear rocking arm 9, the pawl 16 comprises two teeth 16'. The teeth 16' are directed in the direction of the pivotal movement toward the toothed segment 15. The teeth 16' are designed and constructed as counterparts to the teeth of toothed segment 15, and arranged in the normal use of vehicle seat 1 at a small distance from these teeth of toothed segment 15. During an actuation of the height adjuster 11, the rear rocking arm 9 moves, among other things, relative to the seat frame 10. As a result, the toothed segment 15 also moves relative to the pawl 16. As shown in FIGS. 2 and 5, the pawl 16 is aligned with the lower end of toothed segment 15 in the lowest position of rocking arm 9, and with the upper end thereof in the highest position. Due to the curvature of the toothed segment 15, the spacing between the teeth 16' and the toothed segment 15 remains the same, and the teeth 16' remain directed toward the toothed segment 15.

Mounted to the outside of seat frame 10 is a relatively flat lever 22. On its inward directed side, the lever 22 mounts a further annular shoulder 24. The further shoulder 24 comprises an internal toothing, which extends over the entire thickness of lever 22, and which meshes with toothed profile 20. The lever 22 with the further shoulder 24 is rotatably supported in the same bore of seat frame 10 as the pawl 16, with the toothed profile 20 engaging the internal toothing of further shoulder 24 without play. Thus, the seat frame 10 is arranged between the pawl 16 and the lever 22, with the lever 22 and the pawl 16 being interconnected for corotation, and forming a connector in the form of a two-arm lever. On its outward directed side, the lever 22 mounts a laterally projecting pin 28, which serves as a mounting point for a safety belt lock not shown.

A common axis of rotation 30 for pawl 16 and lever 22 extends through the center of shoulders 18 and 24 and of toothed profile 20. The axis of rotation 30 extends parallel to the axle 13 and pin 28. The spacing between the teeth 16' of pawl 16 and the axis of rotation 30 is greater than the spacing between the axis of rotation 30 and the pin 28. The pin 28 and the axis of rotation 30 are located at about the same level with respect to the vehicle floor which is here used as a reference system, the pin 28 being arranged in the longitudinal direction of the vehicle seat 1 before the axis of rotation.

When in the case of a hard braking or a crash, the safety belt is stressed, i.e., a pull is exerted on the belt lock, the belt lock on pin 28 will pull upward. This causes the lever 22 to rotate about axis 30. The tooth engagement between the lever 22 and pawl 16 with toothed profile 20 causes the pawl 16 to rotate likewise. The rotation of pawl 16 causes the teeth 16' to pivot toward the toothed segment 15, and to mesh with the teeth thereof. A tapering, slightly curved shape of teeth 16' and a corresponding shape of the teeth of toothed segment 15 causes a "tooth on tooth" position to change to an "engaged" position, while slightly rotating the pawl 16.

The tensile forces acting upon the seat lock are now introduced directly into the rear rocking arm 9, without stressing the drive of height adjuster 11, which is operative between the rear rocking arm 9 and seat frame 10. Together, the lever 22 and the pawl 16 operate as a connector between the belt lock and the rear rocking arm 9. The teeth 16' form a range of engagement of pawl 16.

What is claimed is:

1. A height adjuster for a vehicle seat that is equipped with a belt lock of a seat belt, the height adjuster comprising:
   a rocking arm pivotably mounted to a seat frame for pivoting relative to the seat frame to adjust the height of the seat frame, with the rocking arm including a toothed segment; and
   a connector including a lever and a pawl that are positioned on opposite sides of the seat frame and mounted to the seat frame so that the lever and the pawl move together with the seat frame relative to the rocking arm when the height of the seat frame is adjusted, wherein:
   the lever and the pawl are connected to one another for corotating relative to the seat frame about an axis of rotation, with the axis of rotation being perpendicular to the seat frame,
   the lever includes a mounting point for the belt lock,
   the lever and the pawl corotate about the axis of rotation relative to the seat frame in response to a predetermined force being applied to the mounting point for the belt lock, so that an engagement mechanism of the pawl engages and transmits force to the toothed segment of the rocking arm,
   the engagement mechanism engages a first section of the toothed segment when the seat frame is at a first adjusted height and the lever and the pawl corotate about the axis of rotation relative to the seat frame in response to the predetermined force being applied to the mounting point for the belt lock,
   the engagement mechanism engages a second section of the toothed segment, which is different from the first section of the toothed segment, when the seat frame is at a second adjusted height, which is different from the first adjusted height, and the lever and the pawl corotate about the axis of rotation relative to the seat frame in response to the predetermined force being applied to the mounting point for the belt lock, and
   the axis of rotation is arranged between the engagement mechanism and the mounting point for the belt lock.

2. A height adjuster according to claim 1, wherein the spacing between the engagement mechanism and the axis of rotation is greater than the spacing between the axis of rotation and the mounting point for the belt lock.

3. A height adjuster according to claim 1, wherein the seat frame includes a front and a rear, wherein the rear of the seat frame is for having a seat back mounted thereto, and the mounting point for the belt lock is positioned forward of the axis of rotation.

4. A height adjuster according to claim 1, wherein the mounting point for the belt lock and the axis of rotation are approximately at the same height.

5. A height adjuster according to claim 1, wherein the engagement mechanism has at least two teeth.

6. A height adjuster according to claim 1, wherein each of the lever and the pawl includes a shoulder integral therewith for bearing upon the seat frame and thereby mounting the connector to the seat frame.

7. A height adjuster according to claim 1, wherein the lever and the pawl mesh with each other by way of a tooth engagement.

8. A height adjuster according to claim 6, wherein the lever and the pawl mesh with each other by way of a tooth engagement.

9. A height adjuster according to claim 1, wherein the lever and the pawl are fit together to form the connector so that the connector pivotably extends through an opening in the seat frame and is thereby pivotably mounted to the seat frame.

10. A height adjuster according to claim 1, wherein the lever is arranged on an outer side of the seat frame and the pawl is arranged on an inner side of the seat frame.

11. A height adjuster according to claim 1, wherein the toothed segment of the rocking is arcuate.

12. A height adjuster according to claim 1, wherein the seat frame is positioned between the engagement mechanism and the mounting point for the belt lock.

13. A height adjuster according to claim 12, wherein the spacing between the engagement mechanism and the axis of rotation is greater than the spacing between the axis of rotation and the mounting point for the belt lock.

14. A height adjuster according to claim 12, wherein the seat frame includes a front and a rear, wherein the rear of the seat frame is for having a seat back mounted thereto, and the mounting point for the belt lock is positioned forward of the axis of rotation of the connector.

15. A height adjuster according to claim 12, wherein the mounting point for the belt lock and the axis of rotation are approximately at the same height.

16. A vehicle seat, comprising:
   a height adjuster including a rocking arm pivotably mounted to a seat frame for pivoting relative to the seat frame to adjust the height of the seat frame, with the rocking arm including a toothed segment; and
   a connector including a lever and a pawl that are positioned on opposite sides of the seat frame and mounted to the seat frame so that the lever and the pawl move together with the seat frame relative to the rocking arm when the height of the seat frame is adjusted, wherein:
   the lever and the pawl are connected to one another for corotating relative to the seat frame about an axis of rotation, with the axis of rotation being perpendicular to the seat frame,
   the lever includes a mounting point to which a belt lock of a seat belt is mounted,
   the lever and the pawl corotate about the axis of rotation relative to the seat frame in response to a predetermined force being applied to the belt lock, so that an engagement mechanism of the pawl engages and transmits force to the toothed segment of the rocking arm,
   the engagement mechanism engages a first section of the toothed segment when the seat frame is at a first adjusted height and the lever and the pawl corotate about the axis of rotation relative to the seat frame in response to the predetermined force being applied to the belt lock,
   the engagement mechanism engages a second section of the toothed segment, which is different from the first section of the toothed segment, when the seat frame is at a second adjusted height, which is different from the first adjusted height, and the lever and the pawl corotate about the axis of rotation relative to the seat frame in response to the predetermined force being applied to the belt lock, and
   the axis of rotation is arranged between the engagement mechanism and the mounting point for the belt lock.

17. A vehicle seat according to claim 16, wherein the seat frame is positioned between the engagement mechanism and the mounting point to which the belt lock is mounted.

18. A vehicle seat according to claim 16, wherein the spacing between the engagement mechanism and the axis of rotation is greater than the spacing between the axis of rotation and the mounting point to which the belt lock is mounted.

19. A vehicle seat according to claim 16, further comprising a seat back mounted to a rear of the seat frame, wherein the mounting point to which the belt lock is mounted is positioned forward of the axis of rotation of the connector.

20. A vehicle seat according to claim 16, wherein the axis of rotation and the mounting point to which the belt lock is mounted are approximately at the same height.

21. A vehicle seat according to claim 16, wherein the lever and the pawl are fit together to form the connector so that the connector pivotably extends through a bore in the seat frame and is thereby pivotably mounted to the seat fame.

22. A vehicle seat according to claim 16, wherein the toothed segment of the rocking arm is arcuate.

* * * * *

UNITED STATES PATENT AND TRADEMARK OFFICE
CERTIFICATE OF CORRECTION

PATENT NO.    : 6,505,888 B1
DATED         : January 14, 2003
INVENTOR(S)   : Teufel et al.

It is certified that error appears in the above-identified patent and that said Letters Patent is hereby corrected as shown below:

Title page,
Item [56], References Cited, U.S. PATENT DOCUMENTS, "Kouck et al." should read -- Koucky et al. --.

Column 4,
Line 57, after "rocking" insert -- arm --.

Signed and Sealed this

Tenth Day of June, 2003

JAMES E. ROGAN
*Director of the United States Patent and Trademark Office*